(12) United States Patent
Wada et al.

(10) Patent No.: US 7,876,207 B2
(45) Date of Patent: Jan. 25, 2011

(54) WAKE-UP CONTROLLER AND A METHOD THEREFOR FOR POWER CONTROL OVER PERIPHERAL CIRCUITRY BASED UPON SLOTS OF A DATA FIELD

(75) Inventors: Hideaki Wada, Kanagawa (JP); Hirosuke Tabata, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 460 days.

(21) Appl. No.: 11/892,827

(22) Filed: Aug. 28, 2007

(65) Prior Publication Data

US 2008/0055099 A1      Mar. 6, 2008

(30) Foreign Application Priority Data

Aug. 31, 2006    (JP)    ............... 2006-235438

(51) Int. Cl.
*B60C 23/00*      (2006.01)
(52) U.S. Cl. ...................................... 340/447; 340/7.34
(58) Field of Classification Search ................. 340/447, 340/7.34
See application file for complete search history.

(56) References Cited

U.S. PATENT DOCUMENTS

| | | | | |
|---|---|---|---|---|
| 5,109,213 A | * | 4/1992 | Williams ..................... | 340/447 |
| 5,392,287 A | * | 2/1995 | Tiedemann et al. ......... | 370/311 |
| 5,621,412 A | * | 4/1997 | Sharpe et al. ............. | 340/10.33 |
| 5,857,146 A | * | 1/1999 | Kido ......................... | 340/7.38 |
| 6,218,936 B1 | * | 4/2001 | Imao ........................... | 340/447 |
| 6,809,638 B2 | * | 10/2004 | Lin ............................. | 340/447 |
| 6,968,073 B1 | * | 11/2005 | O'Boyle et al. ............. | 382/104 |
| 7,397,348 B2 | * | 7/2008 | Iwazumi et al. ........ | 340/426.33 |
| 2002/0044050 A1 | * | 4/2002 | Derbyshire et al. ......... | 340/442 |

FOREIGN PATENT DOCUMENTS

| | | | |
|---|---|---|---|
| JP | 10285002 A | * | 10/1998 |
| JP | 2004215167 A | | 7/2004 |
| JP | 2005-080205 | | 3/2005 |
| JP | 2005260335 A | | 9/2005 |

OTHER PUBLICATIONS

Yokoyama JP 10285002A [Machine Translated Document], Mar. 3, 2010.*

Japanese office action, "Notification of Reason for Refusal" dated on Jan. 21, 2009; Patent application No. JP 2006-235438, pp. 1-3 with English Translation.

* cited by examiner

*Primary Examiner*—George A Bugg
*Assistant Examiner*—Naomi Small
(74) *Attorney, Agent, or Firm*—Studebaker & Brackett PC; Donald R. Studebaker

(57) ABSTRACT

In a wake-up control device for waking up a peripheral circuit such as a transmitter/receiver in a radio communication device, during a standby time in which an RF unit and a processing unit are powered off by a switch, an RF signal is received to produce a detection signal by a detector. The detection signal is transferred to the wake-up controller to be sampled. The header and other fields are detected and counted. A control signal is in turn produced by the respective counts to turn on the switch.

10 Claims, 10 Drawing Sheets

WAKE-UP CONTROLLER AND A METHOD THEREFOR FOR POWER CONTROL OVER PERIPHERAL CIRCUITRY BASED UPON SLOTS OF A DATA FIELD

BACKGROUND OF THE INVENTION

1. Field of the Invention

The present invention relates to a wake-up controller and a method for performing a wake-up control for a peripheral circuit such as a transmitter/receiver circuit.

2. Description of the Background Art

It is expected that a radio communication device carried on a mobile system is operated with low power consumption, which is especially more required for a battery-operated radio communication device. When a frame signal for a radio communication service comprises a time slot corresponding to a header carrying information such as synchronous control, an identification and a service content, and two slots for containing data, it is operated comprehensively with low power consumption by a wake-up control method such that a mobile system is powered on or off in response to a result of detecting a signal in a radio frequency (RF) band. Japanese Patent Laid-Open Publication No. 2005-80205 discloses a transponder, as a radio communication device, which communicates on microwave with an interrogator, and is enabled to communicate with the interrogator by powering on the transponder only when the transponder receives a peculiar start command transmitted from the interrogator and matching a criterion command to decide.

However, when a radio communication device senses other service signals therearound in the same high-frequency band as the device, it may be erroneously operative in wake-up control due to the other service signals. This malfunction may power on the mobile system unnecessarily, thus being a bar to low power consumption. Under the circumstances, especially, a non-contact type of battery-powered mobile communication system comprising semiconductor integrated circuits tends to start the circuits frequently, thereby burning more battery power to shorten its battery run time.

SUMMARY OF THE INVENTION

It is an object of the present invention to provide a wake-up controller and a method therefor with an unnecessary start-up of the wake-up controller minimized.

In accordance with the present invention, a wake-up control device comprises a detector for receiving a predetermined frequency signal to produce a detection signal, a controller operative in response to the detection signal for producing a control signal to perform a wake-up control, and a switch circuit operative in response to the controller for using at least the predetermined frequency signal to power on or off a transmitter/receiver to communicate. The controller controls samples the detection signal to turn on or off the switch circuit based on the number of slots in a header field and a data field forming a frame of the predetermined frequency signal.

In accordance with one aspect of the invention, the controller preferably may include a sampling circuit for detecting a header field and a non-header field to produce a first and a second count-up signal, a first and a second detection counter for counting the first and second count-up signals, respectively, and a decision circuit operative in response to a count in the first and second detection counters for determining whether to turn on or off the switch circuit.

In accordance with another aspect of the invention, preferably, the controller may include a shift register for shifting the detection signal by one stage and two stages to produce a first and a second detection signal, and for producing a logical AND of the first and second detection signals. The sampling circuit may produce the first and second count-up signals based on the value of the logical AND. In addition to the aspect of the invention, the decision circuit may preferably include a timer for measuring a time to perform a pattern check of the detection signal more than once, and produces a control signal to turn on the switch circuit after performing the pattern check more than once.

Moreover, the decision circuit preferably may include a pattern check counter for checking a periodical transition of the detection signal between its "L" and "H" levels, and produce a control signal controlling to turn on the switch circuit based on a frame pattern other than a pattern changing in a short period. In addition, preferably, the switch circuit may be connected to a processor for processing a radio communication service, and responsive to the control signal to supply the processor with an electric power. The predetermined frequency signal may be of a radio frequency.

Preferably, the detector may detect a radio frequency signal through Dedicated Short Range Communications (DSRC), the transmitter/receiver transmits and receives a radio frequency signal through DSRC. The wake-up control device may be powered by a battery.

Further in accordance with the present invention, a method for wake-up control comprises the steps of receiving a predetermined frequency signal to produce a detection signal, producing a control signal to perform the wake-up control in response to the detection signal, using at least the predetermined frequency signal in response to the control signal to power on or off a transmitter/receiver to communicate, and sampling the detection signal to power on or off the transmitter/receiver based on the number of slots of a header field and a data field forming a frame of the predetermined frequency signal.

In accordance with still another aspect of the invention, preferably, the method may further comprise the steps of detecting the header and other fields to produce a first and a second count-up signal, respectively, counting the first and second count-up signals, and powering on or off the transmitter/receiver based on the counts obtained in the step of counting.

In accordance with still another aspect of the invention, preferably, the method may further comprise the steps of shifting the detection signal by one stage and two stages to produce a first and second detection signals, producing the first and second count-up signals from the value of the logical AND of the first and second detection signals, measuring a time to check a pattern of the detection signal more than once, and performing the pattern check more than once and thereafter powering on or off the transmitter/receiver.

Further in accordance with still another aspect of the invention, the method may preferably comprise the steps of performing the pattern check of checking the periodical transition of the detection signal between its "L" and "H" levels to thereby exclude a pattern changing in a short period from the frame pattern, and powering on or off the transmitter/receiver based on a frame pattern excluding the pattern changing in a short period.

In accordance with the present invention, detecting the header field and a field other than the header field can cause the first and second count-up signals to be produced, respectively, and it can therefore be controlled stably to turn on the power supply for a peripheral circuit such as a transmitter/receiver, based on the first and second count-up signals, i.e. the number of time slots of the data. The detection signal is shifted by one stage and two stages and the logical AND is made therebetween to thereby produce the detection signal, based on which count-up is performed in response to the header field, thereby further reducing false detection. Moreover, a frame check performed after a predetermined period lapses and multiple pattern checks are performed, thus rendering false detection further prevented, thereby the unnecessary or erroneous start-up of the wake-up control being stably minimized.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
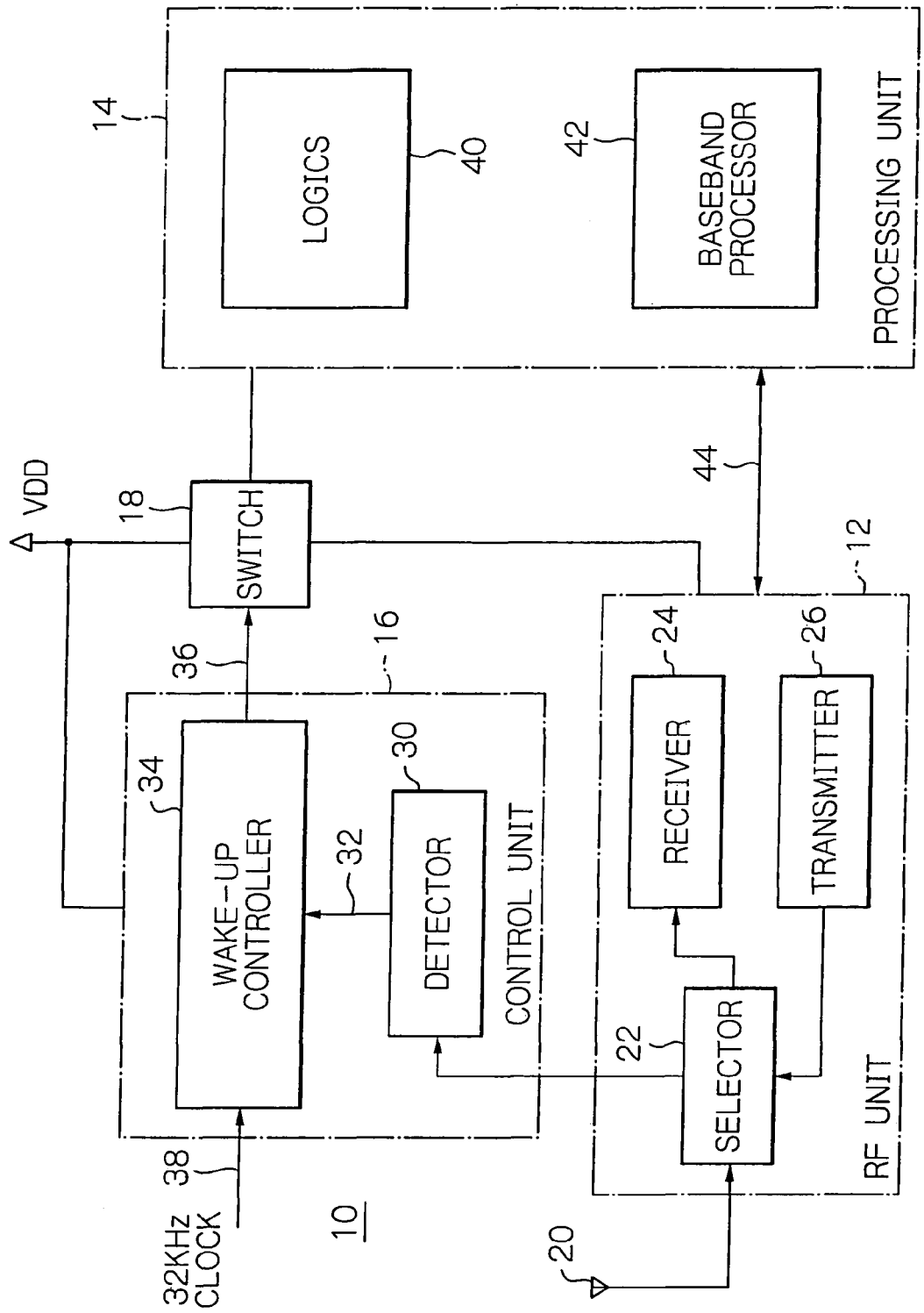
FIG. 1 is a schematic block diagram showing a preferred embodiment of a radio communication device in accordance with the present invention.

Reference will be made to FIG. 1 showing a preferred embodiment of a radio communication device including a wake-up controller in accordance with the present invention. A radio communication device 10 of the preferred embodiment includes a radio frequency (RF) unit 12 transmitting and receiving a radio or wireless signal, a processing unit 14 processing applications for performing various services, a control unit 16 performing the wake-up control for the radio communication device 10, and a switch 18 operative in response to the control unit 16 for turning on and off a power supply for the RF unit 12 and the processing unit 14. A power supply VDD is connected to the switch 18 and the control unit 16, and always provides power for them. Descriptions not directly relevant to the understanding of the present invention will be omitted.

The RF unit 12 is connected to an antenna 20, and has a selector 22 adapted for selectively connecting a receiver 24 or a transmitter 26. When powered on, the selector 22 selects the receiver 24 for receiving a signal, and selects the transmitter 26 for transmitting a signal. The receiver 24 and the transmitter 26 in this embodiment are radio frequency circuits to communicate with a base station using a predetermined radio frequency signal in the 5.8 GHz band, and DSRC (Dedicated Short Range Communications) technology is applied to transmit and receive information at a transmission rate of 1 Mbps using amplitude shift keying (ASK). Contents of communication include information about a smart plate and others, and information about a mobile object and so on is transmitted and received to and from the base station.

Moreover, the selector 22 connects the antenna 20 to a detector 30 in the control unit 16 during a standby period of time of the device 10. The power supply VDD always provides power for the control unit 16, which works even during the standby time. The power supply VDD may be of a regulated power source such as a dry battery or a rechargeable battery. The detector 30 is connected to the antenna 20 through the selector 22, and adapted to receive and detect the radio signal especially during the standby time. The radio signal may be of DSRC as mentioned above.

When the detector 30 decodes header information in a frame signal and thereby detects a signal in a predetermined radio frequency band, the detector 30 outputs on its output port 32 an RF detection signal having its high "H" level only when the header appears. The output 32 is connected to a wake-up controller 34. Signals are designated with reference numerals for connections on which they appear.

The wake-up controller 34 is operative in response to the RF detection signal 32 provided from the detector 30 to output a control signal turning on or off the switch 18 on its output 36. The switch 18 is a power control circuit responsive to the control signal 36 to be rendered conductive to provide the power supply VDD for the RF unit 12 and the processing unit 14 or non-conductive not to provide the power for them during the standby time. The wake-up controller 34 has its input 38 for receiving a clock signal of frequency 32 kHz. The clock signal 38 is produced by an oscillator circuit, not shown, having a quartz oscillator.

The processing unit 14 that is turned on or off by the switch 18 includes logics 40 and a baseband processor 42, and is connected to the RF unit 12 by a connection 44 to process various services.

Figure 2:
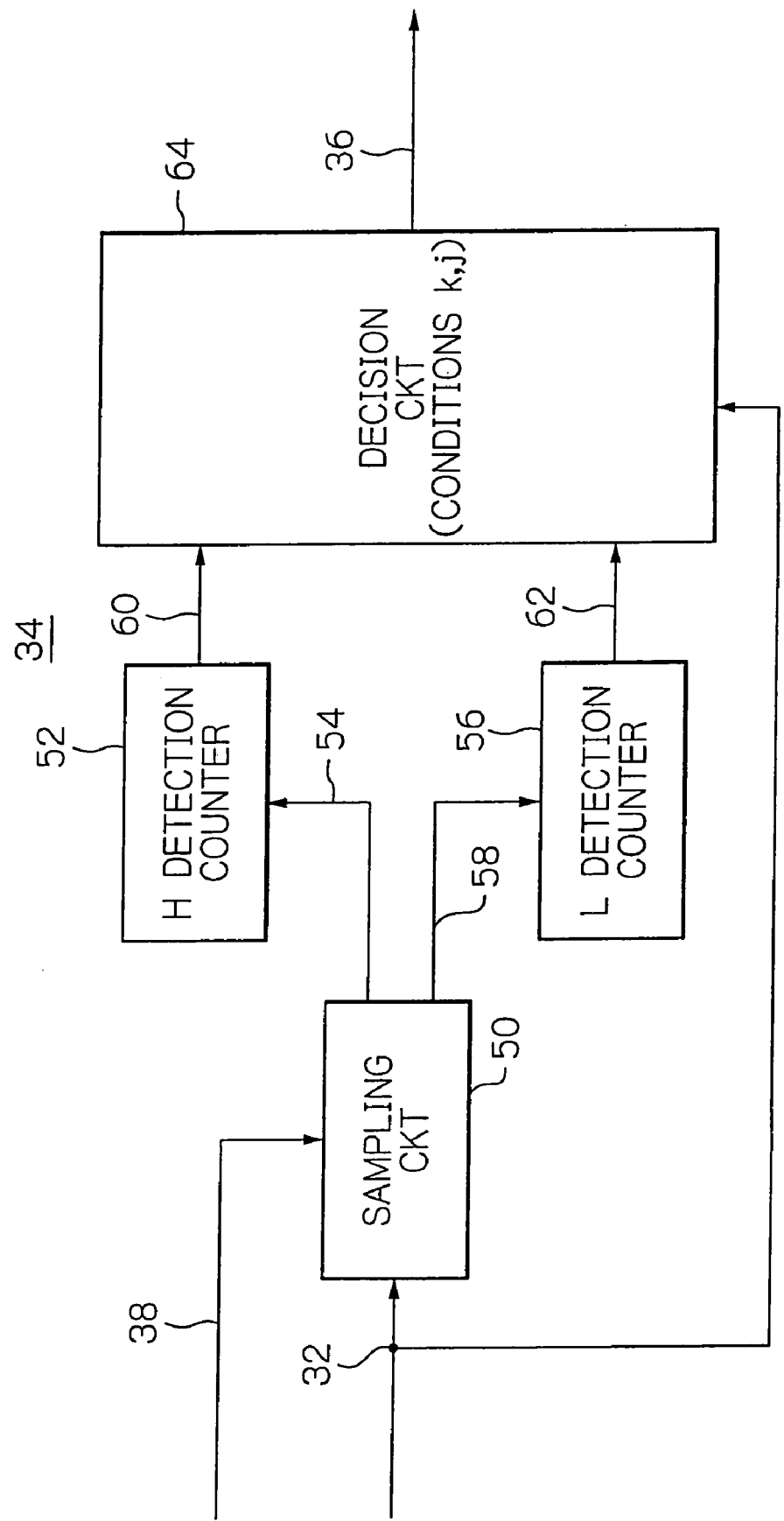
FIG. 2 is a schematic block diagram showing a wake-up controller in the embodiment shown in FIG. 1.

Now, reference is made to FIG. 2 which is an exemplary block diagram of the inside of the wake-up controller 34. As shown in the figure, the RF detection signal 32 and the clock signal 38 are inputted to a sampling circuit 50, which is adapted to sample the RF detection signal 32 every clock period of a frequency 32 kHz. When the switch 18 is turned off to power off, the sampling circuit 50 outputs a signal 54 which enables an H detection counter 52 to count up while the RF detection signal sampled is in its "H" level. The H detection counter 52 is designed so that its count value is set to "0" when it overflows. The sampling circuit 50 outputs, when the RF detection signal sampled is in its low "L" level, a signal 58 that enables an L detection counter 56 to count up. The sampling circuit 50 has its outputs 54 and 58 connected to the H detection counter 52 and L detection counter 56, respectively.

The H detection counter 52 and L detection counter 56 output their counts on outputs 60 and 62, respectively, which are in turn connected to a decision circuit 64. The decision circuit 64 is adapted to be responsive to the count k of the H detection counter 52 and the count j of the L detection counter 56 to determine whether or not a predetermined radio signal is detected. The decision circuit 64 provides the result of determination on its output 36 as an output from the wake-up controller 34.

The decision circuit 64 is adapted to determine whether or not the predetermined radio signal is detected in accordance with the following conditional relationship:

$$h\_cont\_lo < k < h\_conthi \qquad (1)$$

$$l\_cont\_lo \leq j < l\_conthi \qquad (2)$$

where "h_cont_lo" and "h_cont hi" are optional values settable in the H detection counter 52 by software, and "l_cont_lo" and "l_cont hi" are also optional values settable in the L detection counter 56 by software.

With the above formulas (1) and (2) both satisfied, the decision circuit 64 sets, when having received the RF detection signal 32, the control signal 36 to its "H" level to thereby turn on the switch 18 to power on. It is to be noted that, when the control signal 36 is in its "H" level, the H detection counter 52 and L detection counter 56 hold the counts thereof without incrementing.

When communication finishes to render the control signal 36 to its "L" level, the H detection counter 52 and the L detection counter 56 are in response to the negative-going edge of the control signal 36 to thereby reset themselves.

Figure 3:
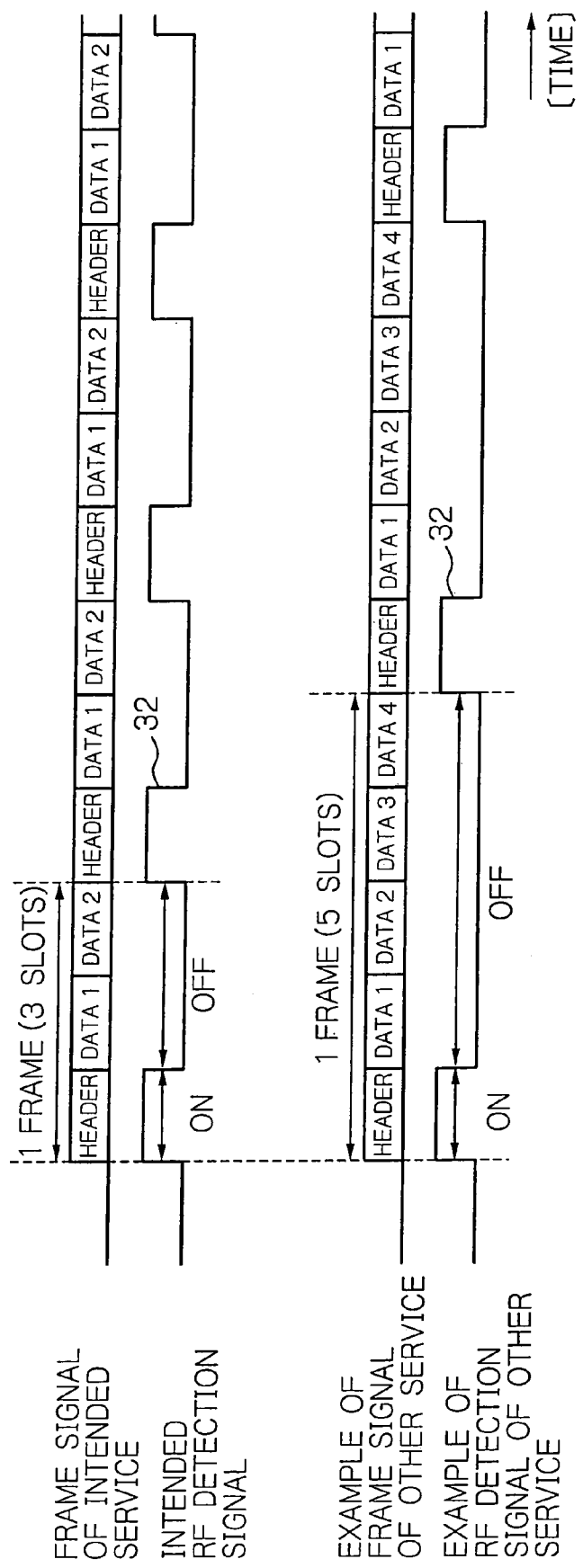
FIG. 3 is a timing diagram showing RF detection signals when frame signals of intended and other services are received.

In the above-mentioned mechanism, FIG. 3 shows exemplary ON and OFF operations in case of detecting frame signals of a desired, or intended, service and others. As shown in the figure, the frame signal of an intended service has three time slots. The frame signal of another service, not intended, has five time slots. In every frame, the RF detection signal 32 is turned on to its "H" level in timed with its header, whereas it is turned off to its "L" level in timed with the time slots containing data. In the present embodiment, the wake-up controller 34 performs a wake-up operation of detecting the frame signal of such an intended service to thereby turn on the switch 18.

Figure 4:
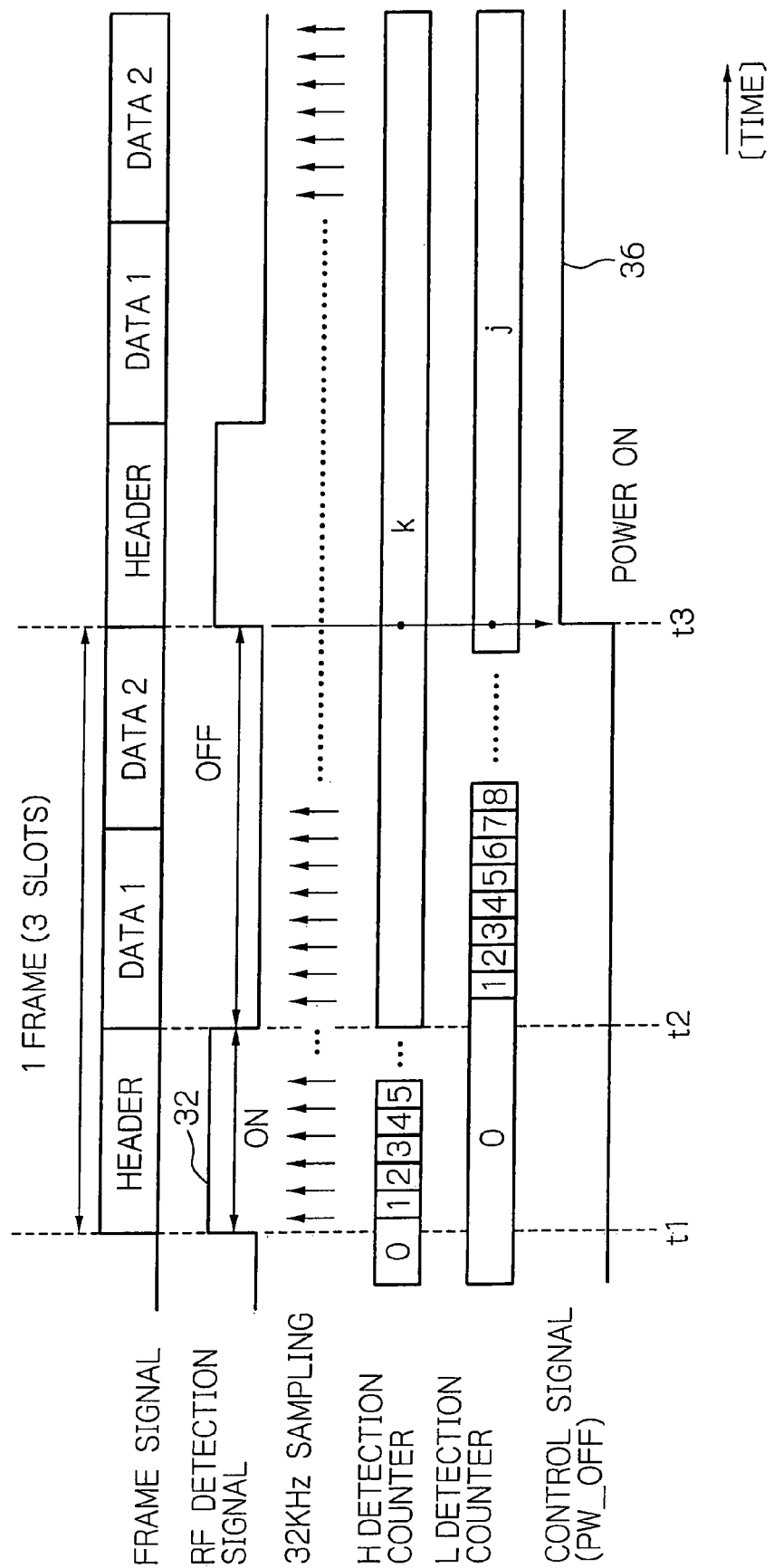
FIG. 4 is a timing diagram useful for understanding operations of the wake-up controller shown in FIG. 2.

Further with reference to FIG. 4, operations of the wake-up controller 34 will be described in case of detecting the frame signal of an intended service. The sampling circuit 50 samples the RF detection signal 32 representing the on or off state detected, the H detection counter 52 counts up from time t1 to t2, and the L detection counter 56 counts up from time t2 to t3. Next, when the above formulas (1) and (2) are satisfied and the next header is detected by the RF detection signal 32, the decision circuit 64 changes the control signal 36 for the switch 18 from its "L" level to "H" level, i.e. rendering the signal PW_OFF high. This results in providing the power supply VDD to the RF unit 12 and the processing unit 14 through the switch 18, thus processing the intended service. For example, information about a license plate of a mobile object may be transmitted to a base station or information may be received from the base station so as to serve a movement of the mobile object.

In this way, the state of the header of an incoming frame signal of the intended service is sampled and counted, and the patterns of the header appearing is compared with the set conditional states to detect the "H" and "L" levels which continue longer than a predetermined period in the RF detection signal 32, thereby determining the number of slots in the intended frame signal so as to perform the wake-up control.

In summary, the frame of an intended service can be distinguished based on a difference in number of time slots between intended and other services. In this case, the pattern of the header appearing in an intended service is thus different from other services because of a difference in number of slots therebetween, so that malfunctions are prevented which would otherwise be caused to be responsive to the RF detection signal of other services detected to wake up for peripheral circuits such as the RF unit 12 and the processing unit 14 without using such other signals, for example. Also, even if a noise causes a pulse of short period, it is prevented from erroneously starting up the peripheral circuits.

Figure 5:
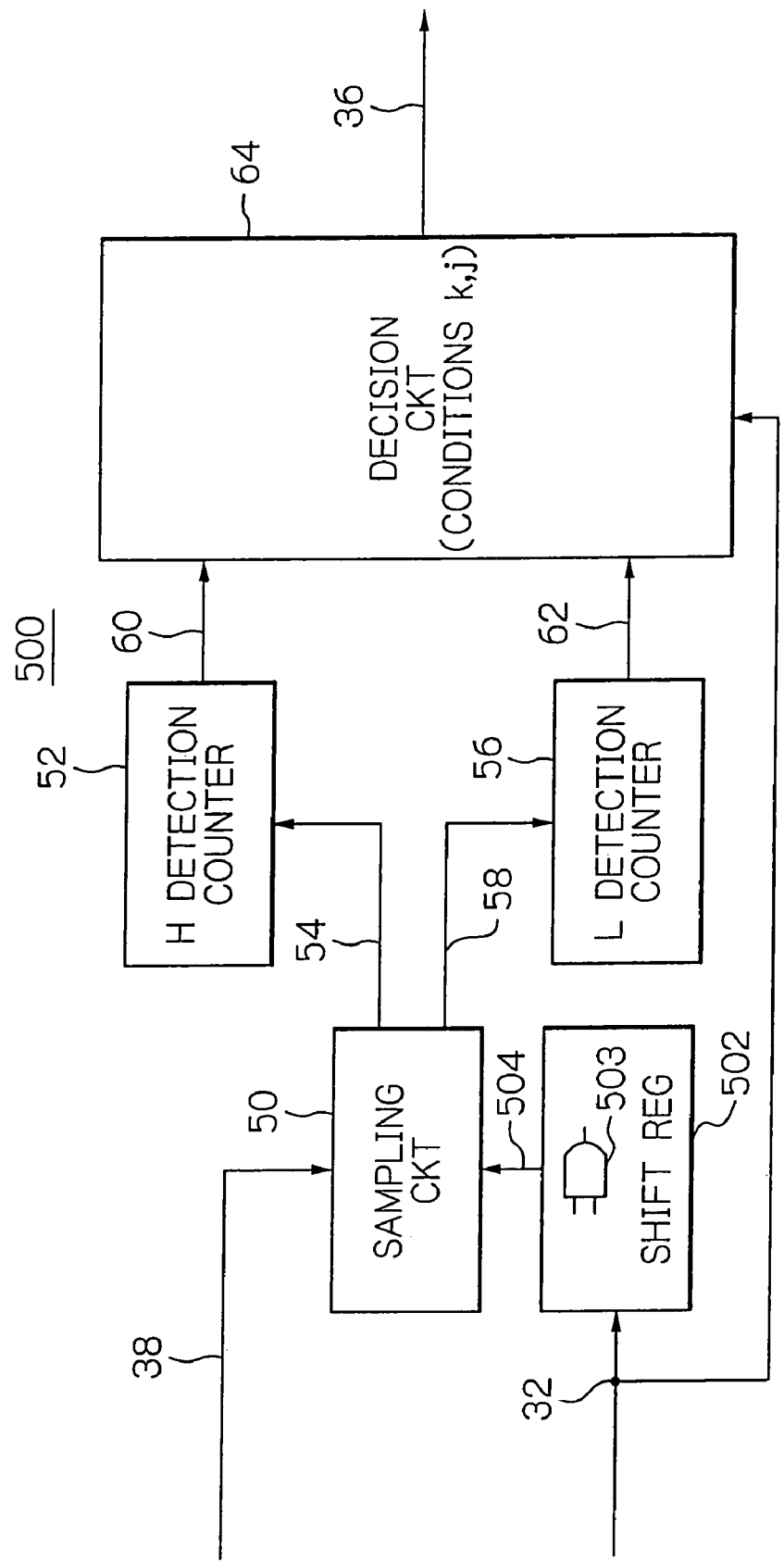
FIG. 5 is a schematic block diagram showing an alternative embodiment of the wake-up controller.

Next, FIG. 5 will be referred to which shows in an exemplary block diagram an alternative embodiment 500 of the wake-up controller. As shown in the figure, awake-up controller 500 comprises the wake-up controller 34 shown in FIG. 2 and a two-stage shift register 502. Because the structure may be the same as the controller 34 shown in FIG. 2 except for the two-stage shift register 502, a repetitive description thereon will be omitted.

The two-stage shift register 502 is adapted to shift the RF detection signal 32 by one to produce a resultant signal det1 and by two stages to produce a resultant signal det2, and perform a logical AND between the signals det1 and det2 to produce a resultant signal 504 to the sampling circuit 50 connected to the output 504. For this aim, the two-stage shift register 502 has an AND circuit 503, symbolically illustrated, having its output interconnected to the output 504.

Figure 6:
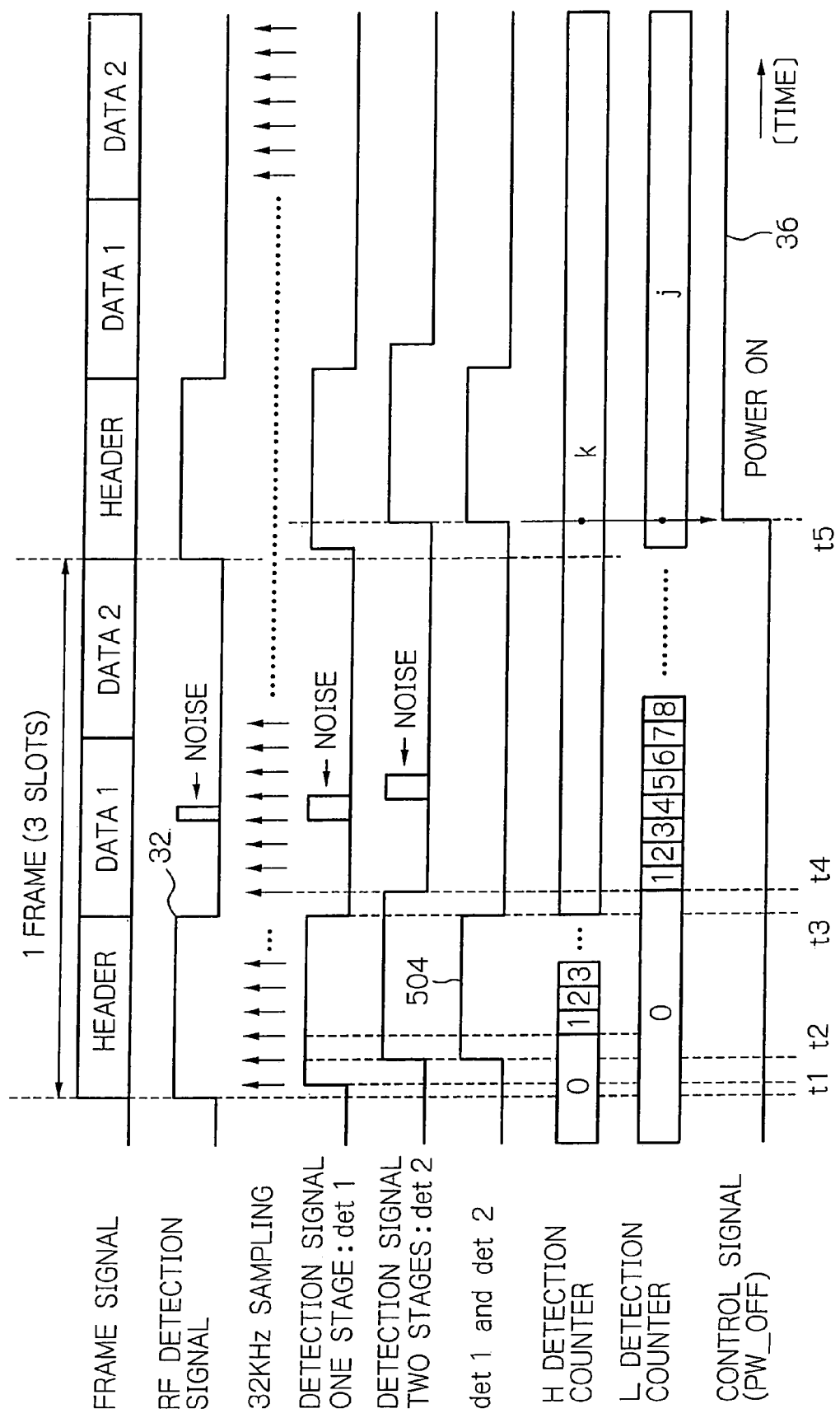
FIG. 6 is a timing diagram useful for understanding operations of the alternative embodiment shown in FIG. 5.

As shown in FIG. 6, the wake-up controller 500 produces a signal det1 from time t1 to t3 and a signal det2 from time t2 to t4, and the logical AND of both signals appears in the form of detection signal 504 from time t2 to t3. The detection signal 504 is in turn sampled by the sampling circuit 50, and activates the H detection counter 52 to count up. On the other hand, the L detection counter 56 counts up from time t3 to t5. In this case, even if an impulse noise is superimposed while the RF detection signal 32 is in its "L" level, then it can be ignored so that the counters 52 and 56 are prevented from incrementing to erroneously detect a header. The two-stage shift register 502 thus forms a noise rejection circuit stabilizing the RF detection signal 504 such that the pattern check can be performed.

Figure 7:
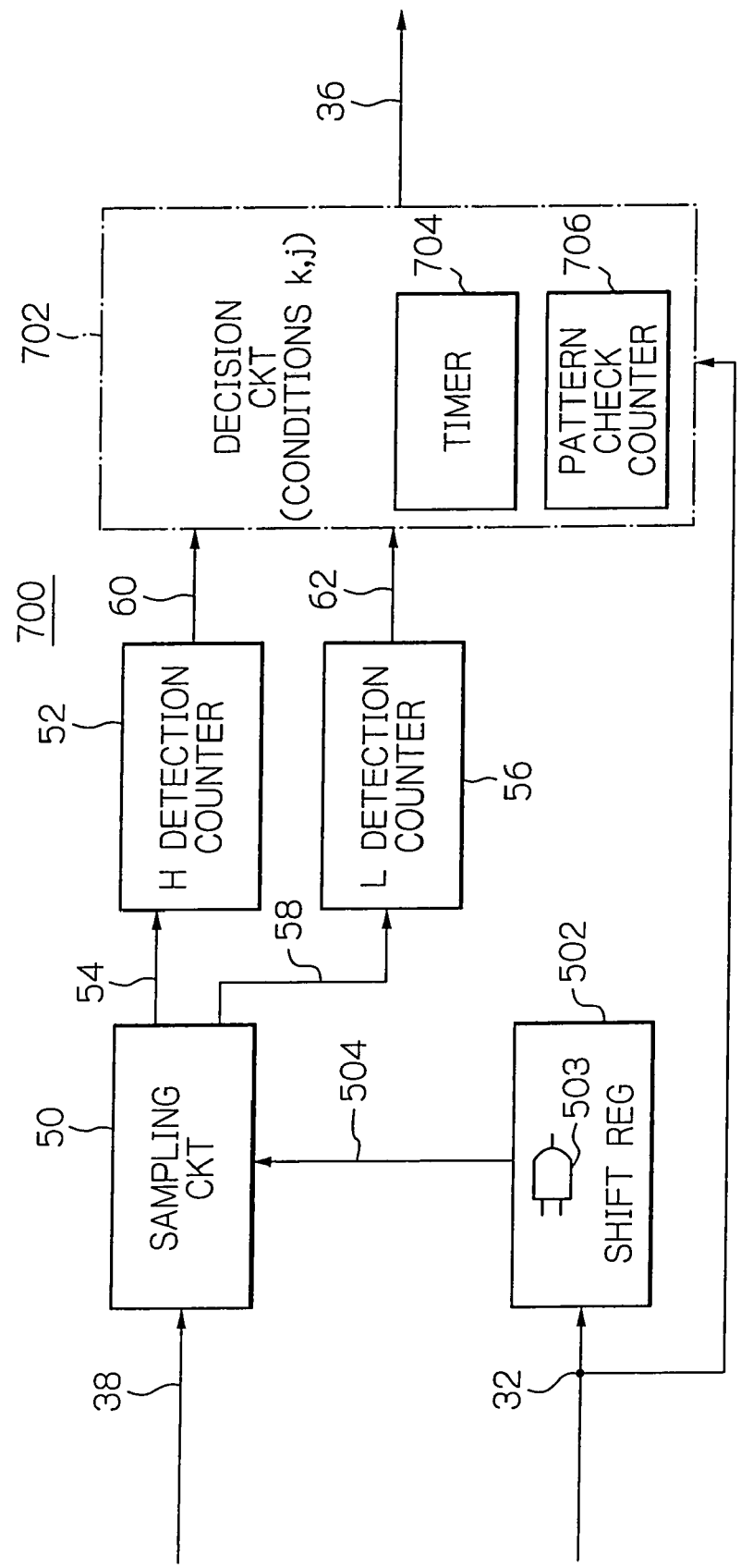
FIG. 7 is a schematic block diagram showing another alternative embodiment of the wake-up controller.

Well, FIG. 7 illustrates another alternative embodiment 700 of the wake-up controller. A wake-up controller 700 in this alternative embodiment may be the same as the wake-up controller 500 shown in FIG. 5 except for comprising a decision circuit 702 instead of the decision circuit 64 included in the embodiment shown in FIG. 5. Because the structure except for that is the same, a repetitive description will be omitted. As shown in FIG. 7, the decision circuit 702 additionally comprises a timer 704 and a pattern check circuit 706. The functions of the decision circuit 702 except for the timer 704 and check circuit 706 may be the same as the decision circuit 64 shown in FIG. 5.

The radio communication device 10 comprising the wake-up controller 700 stays, right after its initial state, in a state for setting parameters of the timer 704, to which parameters are set which are different in value from each other between the state of the end of communication and the state of abnormal pattern. In this state, because peripheral circuits such as the RF unit 12 and the processing unit 14, FIG. 1, remain powered off, the parameter value for the abnormal pattern state is set to the timer 704.

Figure 8:
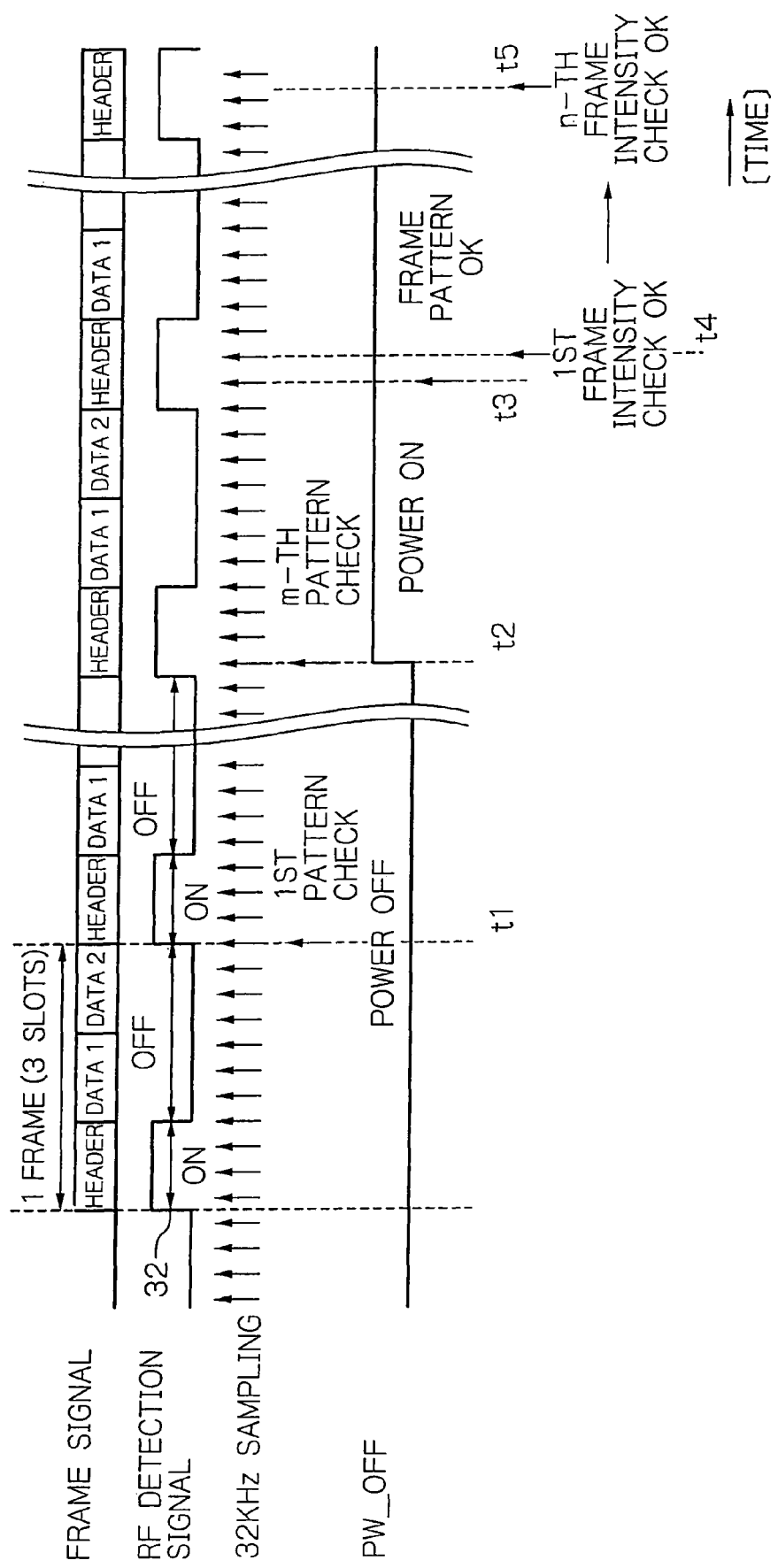
FIG. 8 is a timing diagram useful for understanding operations of the other alternative embodiment shown in FIG. 7.

If the timer 704 overflows, i.e. reaches a value that is set in its setting condition, the timer 704 will then restart to count up from the initial value until reaching the latter. The pattern check is performed a plurality (m) of times since time t1 in the pattern check process, as shown in FIG. 8. If the pattern check is completed successfully (OK) m times, then the control signal to power on the peripheral circuits will be outputted on the output 36 and the switch 18 will be controlled to be turned on (time t2). Here the value m can be set to any natural number by software.

The baseband processor 42 in the processing unit 14 shown in FIG. 1 detects, when powered on, a pattern from the header of a frame signal provided on the connection line 44 from the RF unit 12, and checks whether or not the communication is synchronized, as will be referred to as a frame pattern check. When the communication is synchronized successfully (OK), a service check is performed after that (time t3). In this case, if the communication is not synchronized, the control will then return to the state for setting parameters of the timer 704.

In the service check, a service carried by the frame signal from the RF unit 12 is checked. If the service is an intended one, the control will then move to an electric field intensity check. Otherwise, the control will return to the state for setting parameters of the timer 704.

The baseband processor 42 checks the electric field intensity detected by the RF unit 12 a plurality (n) of times since time t4, where the value n may be set to any natural number by software. If the electric field intensity equal to or more than a predetermined value is detected the predetermined n times or more since time t4, the electric field intensity check will then be determined successful (OK) and the control will move to the start of communication (time t5). Otherwise, i.e. if the electric field intensity equal to or more than the predetermined value is not detected n times since time t4, the control will then return to the state of frame pattern check.

Upon finishing the communication state of the radio communication device 10, the control returns to the state for setting parameters of the timer 704, in which the value of parameter for the state of the end of communication is set to the timer 704. After that, the switch 18 is turned off to thereby power off the peripheral circuits.

Figure 9:
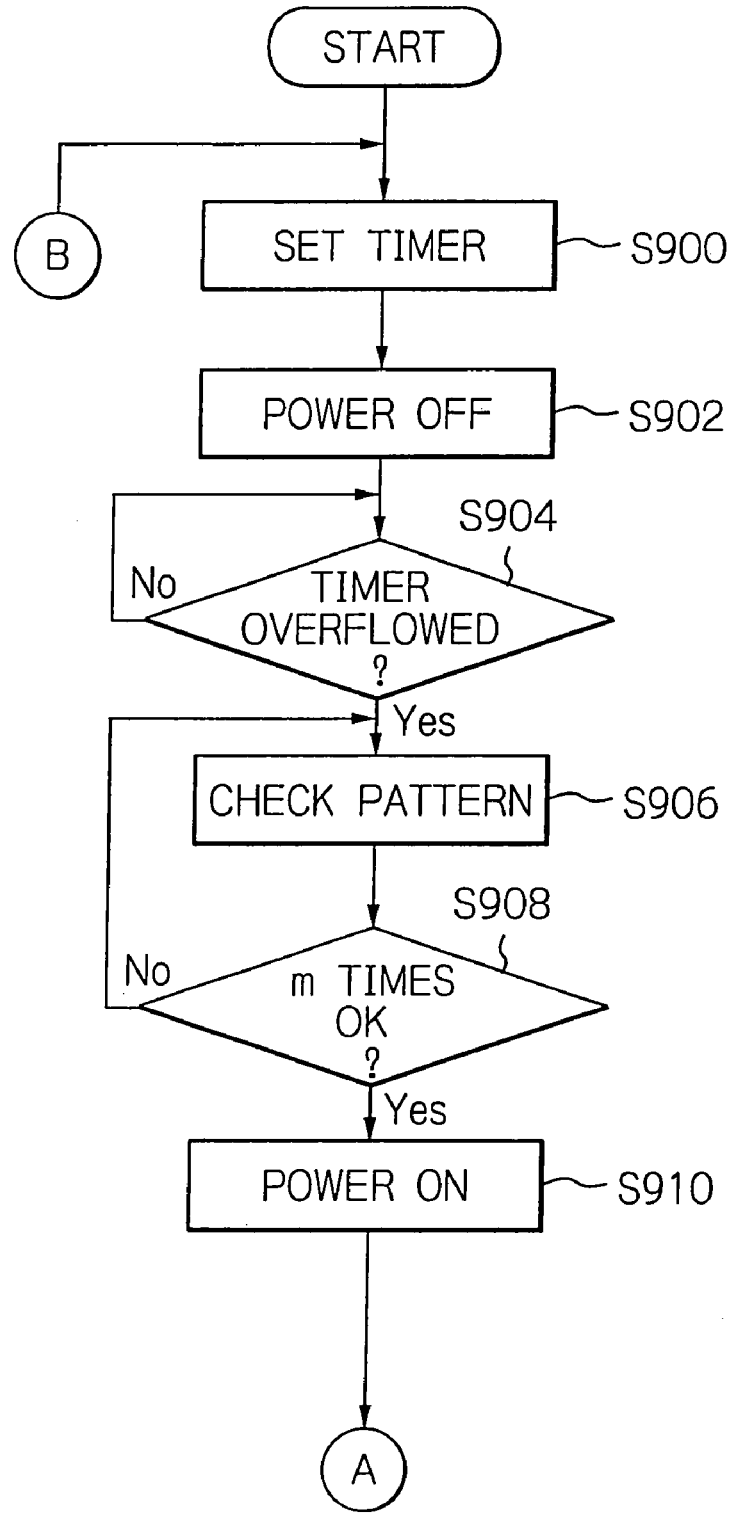
FIGS. 9 and 10 are flowcharts useful for understanding operations of the embodiment shown in FIG. 7.
Figure 10:
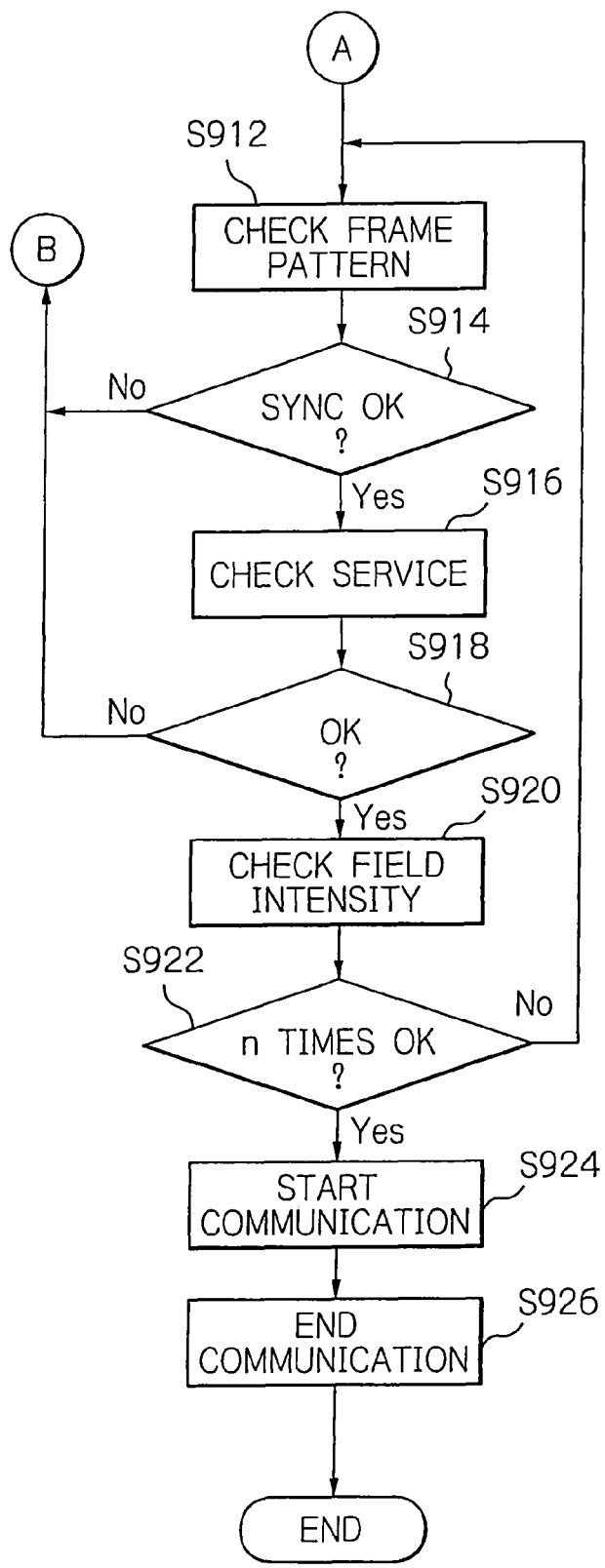

Next, with reference to the flowcharts of FIGS. 9 and 10, operations of the radio communication device 10 comprising the wake-up controller 700 will be described. In a step S900 shown in FIG. 9, right after the initializing state the timer 704 is set. After completing the setting, the timer 704 starts to count and the radio communication device 10 is controlled to be powered off (step S902) by turning off the switch 18, FIG. 1.

In the following step S904, it is determined whether or not the timer 704 overflows. If the timer overflows, the control will then move to a step S906, in which the pattern check is performed. The pattern check is performed to determine whether or not it is successful m times in the following step S908. If it is successful m times, the control will then move to a step S910. If not successful m times, the pattern check will repeat in the step S906.

If the pattern check is successful m times, the switch 18 is controlled to be turned on in the step S910 to thereby power on the radio communication device 10. Moving to the next step S912 shown in FIG. 10, the frame pattern check is processed. If the frame synchronization is determined successful, the control will move to a step S916. If not successful, then the process will return to the step S900 to repeat the following steps.

In the step S916, the service check is performed. If the intended service is detected in a step 918, the process will move to a step S920. If the intended service is not detected, it will return to the step S900 to repeat the following steps. Moving to the step S920 further, the electric field intensity check is performed. In the following step S922, if the electric field intensity equal to or more than the predetermined value is detected the predetermined n times or more, then the process will move to a step S924 to start communication. Now, when the communication is finished (step S926), the process returns to the step S900 shown in FIG. 9 to repeat the steps following thereto. In the step S922, if the electric field intensity equal to or more than the predetermined value is not detected n times, then the process will return to the step S912 to perform the frame pattern check again, and then repeat the following steps.

As described above, in this alternative embodiment, the wake-up controller 700 comprises the timer 704. If the pattern check is not successful, the next pattern check will not be performed immediately, but after the state of the detected radio signal becomes stable. Therefore, the pattern check can be performed in the stable state of the RF detection signal. Also, the next pattern check is not performed right after the end of communication, but can be performed in the stable state of the RF detection signal after the peripheral circuits are powered off completely.

Also in the instant alternative embodiment, the wake-up controller 700 comprising the pattern check circuit 706 determines the pattern check successful the predetermined times and then powers on the peripheral circuits. It can be confirmed that the RF detection signal periodically takes its "H" and "L" levels. Therefore, the detector 30 is prevented from erroneously powering on the peripheral circuits when the pattern of "H" and "L" levels is mixed by the effect of other services.

Moreover, the illustrative embodiments described above are exemplarily directed to radio communication devices, but they can be applied to other things. For example, they can be applied to processing circuits of wired communications involving a lot of noises and using a weak signal intensity.

The entire disclosure of Japanese patent application No. 2006-235438 filed on Aug. 31, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A wake-up control device comprising:
   a detector for receiving a predetermined frequency signal to produce a detection signal;
   a controller operative in response to the detection signal for producing a control signal performing a wake-up control;
   a switch circuit operative in response to said controller for using at least the predetermined frequency signal to power on or off a transmitter/receiver transmitting or receiving information;
   said controller sampling the detection signal to turn on or off said switch circuit based on a number of slots in a header field and a data field forming a frame of the predetermined frequency signal;
   a sampling circuit operative in response to the header field detected for producing a first count-up signal, and operative in response to a field detected other than the header field for producing a second count-up signal;
   a first detection counter for counting the first count-up signal;
   a second detection counter for counting the second count-up signal; and
   a decision circuit operative in response to a count in said first and second detection counters for determining whether said switch circuit is to be turned on or off;
   wherein said controller comprises a shift register for shifting the detection signal by one stage and two stages to produce a first and a second detection signal, and for producing a logical AND of the first and second detection signals,
   said sampling circuit using the logical AND to produce the first and second count-up signals.

2. The device in accordance with claim 1, wherein said decision circuit comprises a timer for measuring time to perform a pattern check more than once for the detection signal, said decision circuit producing a control signal controlling to turn on said switch circuit after performing the pattern check more than once.

3. The device in accordance with claim 1, wherein said decision circuit comprises a pattern check counter for checking a periodical transition of the detection signal between a low level and a high level, said decision circuit producing a control signal controlling to turn on said switch circuit based on a frame pattern other than a pattern changing in a short period.

4. The device in accordance with claim 1, wherein said switch circuit is connected to a processor for processing a radio communication service, said switch circuit being responsive to the control signal to supply said processor with an electric power.

5. The device in accordance with claim 1, wherein the predetermined frequency signal is of a radio frequency.

6. The device in accordance with claim 1, wherein said detector detects a radio frequency signal of Dedicated Short Range Communications (DSRC), said transmitter/receiver transmitting or receiving the radio frequency signal of DSRC.

7. The device in accordance with claim 1, wherein said wake-up controller is powered by a battery.

8. A method for wake-up control comprising the steps of:
receiving a predetermined frequency signal to produce a detection signal;
producing a control signal to perform a wake-up control in response to the detection signal;
using at least the predetermined frequency signal in response to the control signal to power on or off a transmitter/receiver transmitting or receiving information;
sampling the detection signal to power on or off the transmitter/receiver based on a number of slots of a header field and a data field forming a frame of the predetermined frequency signal;
detecting the header field to produce a first count-up signal, and detecting a field other than the header field to produce a second count-up signal;
counting the first and second count-up signals;
powering on or off the transmitter/receiver based on a count obtained in said step of counting;
shifting the detection signal by one stage and two stages to produce a first and a second detection signal; and
producing a logical AND of the first and second detection signals; and
using the logical AND to produce the first and second count-up signals.

9. The method in accordance with claim 8, further comprising the steps of:
measuring time to perform a pattern check more than once for the detection signal; and
performing the pattern check more than once and thereafter powering on or off the transmitter/receiver.

10. The method in accordance with claim 8, further comprising the steps of:
performing pattern check of checking a periodical transition of the detection signal between a low level and a high level to thereby exclude a pattern changing in a short period from a frame pattern; and
powering on or off the transmitter/receiver based on a frame pattern excluding the pattern changing in the short period.

* * * * *